(12) United States Patent
Noland et al.

(10) Patent No.: US 12,003,588 B2
(45) Date of Patent: Jun. 4, 2024

(54) COALESCING PACKETS WITH MULTIPLE WRITERS IN A STATELESS NETWORK FUNCTION

(71) Applicant: Stateless, Inc., Boulder, CO (US)

(72) Inventors: Daniel Noland, Boulder, CO (US); Ofer Hirsch Gill, Longmont, CO (US)

(73) Assignee: STATELESS, INC., Boulder, CO (US)

( * ) Notice: Subject to any disclaimer, the term of this patent is extended or adjusted under 35 U.S.C. 154(b) by 49 days.

(21) Appl. No.: 17/711,774

(22) Filed: Apr. 1, 2022

(65) Prior Publication Data

US 2022/0329661 A1 Oct. 13, 2022

Related U.S. Application Data

(60) Provisional application No. 63/169,633, filed on Apr. 1, 2021.

(51) Int. Cl.
*H04L 67/142* (2022.01)
*H04L 43/028* (2022.01)
*H04L 69/16* (2022.01)

(52) U.S. Cl.
CPC .......... *H04L 67/142* (2013.01); *H04L 43/028* (2013.01); *H04L 69/169* (2013.01)

(58) Field of Classification Search
None
See application file for complete search history.

(56) References Cited

U.S. PATENT DOCUMENTS

| | | |
|---|---|---|
| 9,898,446 B2 | 2/2018 | Weber et al. |
| 10,425,348 B2 | 9/2019 | Keller et al. |
| 2015/0106420 A1 | 4/2015 | Warfield et al. |
| 2016/0337481 A1 | 11/2016 | Smedberg et al. |

(Continued)

FOREIGN PATENT DOCUMENTS

| | | |
|---|---|---|
| CN | 104714848 | 6/2015 |
| CN | 104714836 | 1/2018 |

*Primary Examiner* — Srinivasa R Reddivalam
(74) *Attorney, Agent, or Firm* — BRYAN CAVE LEIGHTON PAISNER LLP (57) ABSTRACT

A method including receiving a batch of events at a processing system of a distributed stream processing system including multiple processing systems in data communication with a shared state data store. The method also can include determining, at the processing system, database operations associated with the events. The method additionally can include coalescing, at the processing system, the database operations into one or more speculative database operations with one or more associated reject rules. The processing system stores a speculative state of at least a portion of the shared state data store. The one or more associated reject rules are based on the speculative state. The method further can include sending the one or more speculative database operations and the one or more associated reject rules from the processing system to the shared state data store to cause the shared state data store to determine whether to reject one or more of the one or more speculative database operations based on an authoritative state in the shared state data store. The method additionally can include receiving, at the processing system, one or more responses from the shared state data store. Other embodiments are described.

17 Claims, 4 Drawing Sheets

(56) References Cited

U.S. PATENT DOCUMENTS

2017/0026301 A1\* 1/2017 Keller .................. H04L 47/621
2017/0250869 A1 8/2017 Voellmy
2018/0115514 A1\* 4/2018 Chou ..................... G06F 21/50
2021/0004244 A1\* 1/2021 Ravid .............. G06F 16/24568

\* cited by examiner

COALESCING PACKETS WITH MULTIPLE WRITERS IN A STATELESS NETWORK FUNCTION

CROSS-REFERENCE TO RELATED APPLICATIONS

This application claims the benefit of U.S. Provisional Application No. 63/169,633, filed Apr. 1, 2021. U.S. Provisional Application No. 63/169,633 is incorporated herein by reference in its entirety. Additionally, U.S. patent application Ser. No. 15/220,129, filed Jul. 26, 2016, and issued as U.S. Pat. No. 10,425,348 on Sep. 24, 2019 (referred to herein as the "'348 Patent"), is incorporated herein by reference in its entirety.

TECHNICAL FIELD

This disclosure relates generally to communication networks, and related more particularly to coalescing packets with multiple writers in a stateless network function.

BACKGROUND

Modern communication networks typically include network functions, which can be deployed on physical appliances or implemented in software, such as on commodity servers in a virtualized environment. Multiple processors can be used for horizontal scaling, but using multiple processors can result in the multiple-writers' problem, with inconsistent shared state data. Streaming events in a distributed system can further complicate the problem, because there is no absolute ordering of events among the multiple processors.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments include a method including receiving a batch of events at a processing system of a distributed stream processing system including multiple processing systems in data communication with a shared state data store. The method also can include determining, at the processing system, database operations associated with the events. The method additionally can include coalescing, at the processing system, the database operations into one or more speculative database operations with one or more associated reject rules. The processing system stores a speculative state of at least a portion of the shared state data store. The one or more associated reject rules are based on the speculative state. The method further can include sending the one or more speculative database operations and the one or more associated reject rules from the processing system to the shared state data store to cause the shared state data store to determine whether to reject one or more of the one or more speculative database operations based on an authoritative state in the shared state data store. The method additionally can include receiving, at the processing system, one or more responses from the shared state data store.

A number of embodiments include a one or more computer-readable media storing computing instructions that, when executed on a processor, cause the processor to perform various acts. The acts can include receiving a batch of events at a processing system of a distributed stream processing system including multiple processing systems in data communication with a shared state data store. The acts also can include determining, at the processing system, database operations associated with the events. The acts additionally can include coalescing, at the processing system, the database operations into one or more speculative database operations with one or more associated reject rules. The processing system stores a speculative state of at least a portion of the shared state data store. The one or more associated reject rules are based on the speculative state. The acts further can include sending the one or more speculative database operations and the one or more associated reject rules from the processing system to the shared state data store to cause the shared state data store to determine whether to reject one or more of the one or more speculative database operations based on an authoritative state in the shared state data store. The acts additionally can include receiving, at the processing system, one or more responses from the shared state data store.

Further embodiments include a system including a processor and one or more non-transitory computer-readable media storing computing instructions that, when executed on the processor, cause the processor to perform various acts. The acts can include receiving a batch of events at a processing system of a distributed stream processing system including multiple processing systems in data communication with a shared state data store. The acts also can include determining, at the processing system, database operations associated with the events. The acts additionally can include coalescing, at the processing system, the database operations into one or more speculative database operations with one or more associated reject rules. The processing system stores a speculative state of at least a portion of the shared state data store. The one or more associated reject rules are based on the speculative state. The acts further can include sending the one or more speculative database operations and the one or more associated reject rules from the processing system to the shared state data store to cause the shared state data store to determine whether to reject one or more of the one or more speculative database operations based on an authoritative state in the shared state data store. The acts additionally can include receiving, at the processing system, one or more responses from the shared state data store.

In a number of embodiments, multiple computing systems can access a shared state data store that is located outside each of the multiple computing system. For example, the multiple computing systems can be multiple stateless network function, which can be instantiated on one more computer systems. The stateless network functions can be similar or identical to the stateless network functions shown and described in the '348 Patent. In other embodiments, each of the multiple computing system can be one or more other types of systems, such as systems that are event processors. The state data store can be similar or identical to the state data store shown and described in the '348 Patent.

In many embodiments, a stateless cluster of network functions can be used to provide load balancing, to provide fault tolerance against failure conditions, such as those failure conditions shown in FIGS. 2A-2D of the '348 Patent, and/or to provide tenant elasticity (e.g., to dynamically increase and/or decrease resources).

Figure 1:
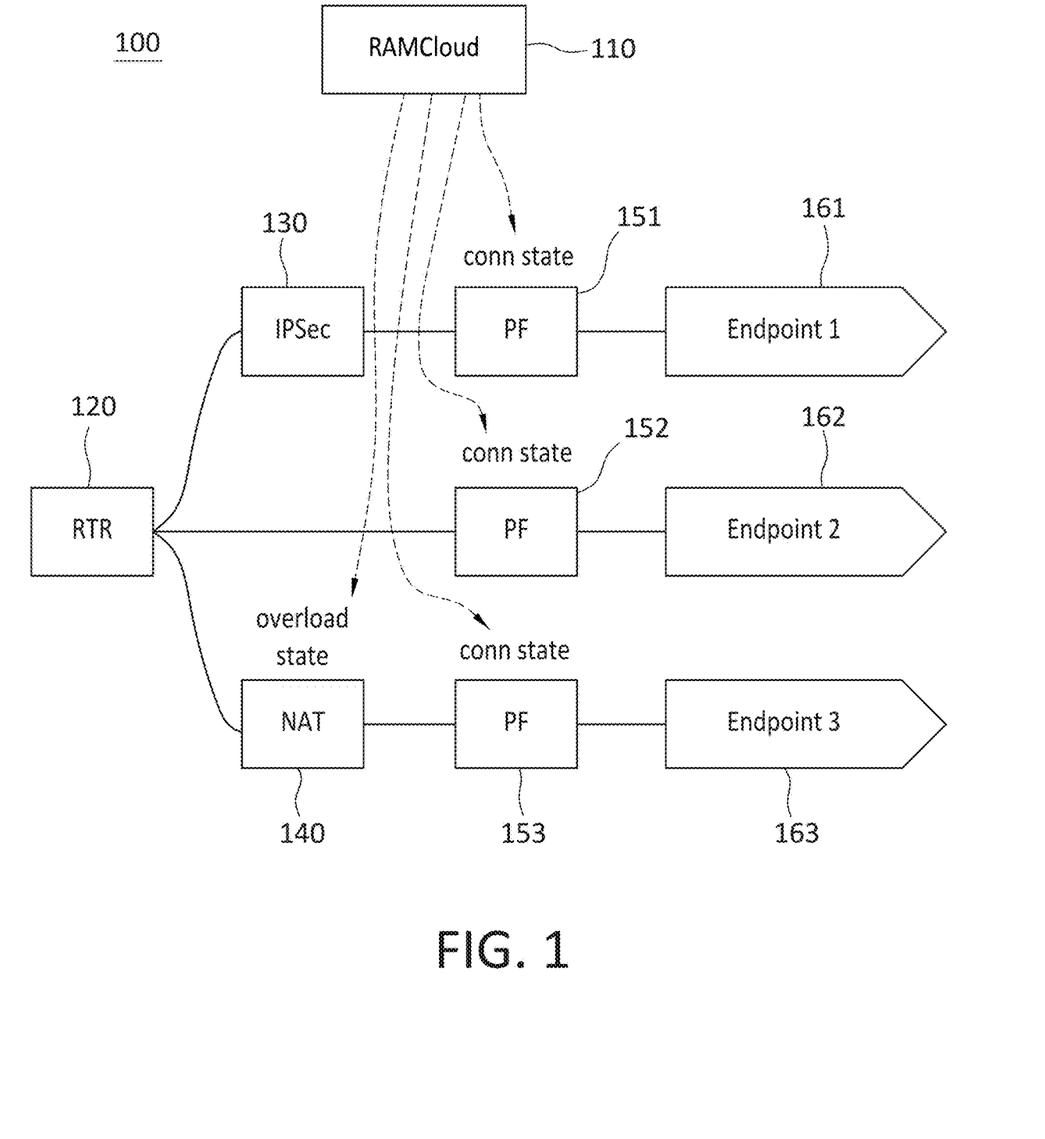
FIG. 1 illustrates an example of a stateless cluster, which includes four types of hosts providing network functions.

Turning to the drawings, FIG. 1 illustrates an example of a stateless cluster 100, which includes four types of hosts providing network functions. These network functions of stateless cluster 100 include three PFs (packet filters) 151-153, one NAT (network address translator) 140, one Router (RTR) 120, and one IPSec (Internet Protocol Security) 130. Some of these network functions are inherently stateless, and some of these network functions can store state, e.g., stored in RAMCloud 110. These network functions can be connected, directly or indirectly, endpoints 161-163. Each network function can receive packets from another system, process the packets, and provide the packets back to the system or to another system. In the example shown in FIG. 1, there can be two switches. In many embodiments, each network function can access a state data store, such as RAMCloud 110, which is located outside the network function and/or hosts. The state data used by the network functions can be stored in the remote state data store, such that the network functions do not store the state data (or to the extent that state data is stored, it is not the authoritative state data stored in the state data store). For example, the connection state for the PFs, and the overload state for the NATs can be stored in RAMCloud 110.

Figure 2:
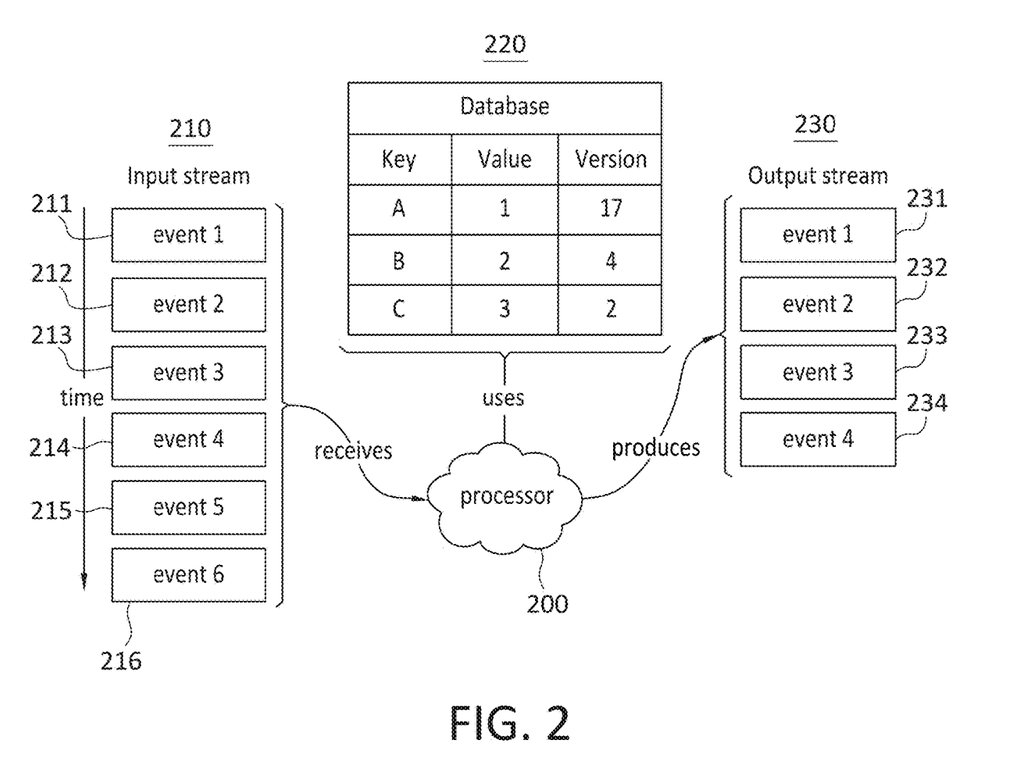
FIG. 2 illustrates a computing system that processes events using a state data store located outside the computing system.

Turning ahead in the drawings, FIG. 2 illustrates a computing system 200 (e.g., a host), which can be a processor that processes events using a state data store 220 located outside computing system 200. As described above, in some embodiments, computing system 200 can be a stateless network function. In other embodiments, computing system 200 can be another type of event processor that receives an input stream 210 of events (e.g., networking packets, or other types of events), processes the events using state data store 220, and/or produces an output stream 230 of events (e.g., network packets, or another types of events). In some embodiments, state data store 220 can provide key-value storage, in which computing system 200 can read values by providing a key, which results in returning the value associated with the key, and/or by writing values by providing both the key and the value. In many embodiments, a database in state data store 220 can store the keys, the respective value associated with each key, and a respective version for each key. In many embodiments, the version can be incremented each time the value of the key is changed. In many embodiments, when a value for a key is read, the version associated with the key and its associated value can be returned, and when a value is written for a key, the version associated with the key is incremented, and in many embodiments, can be returned.

As an example of the flow through computing system 200 in FIG. 2, input stream 210 can arrive at computing system 200 (e.g., a computing system that includes a processor and hosts a network function). Input stream 210 can include events 211-216. Computing system 200 can process input stream 210 using the database in state data store 200 located outside computing system 200. In some cases, the database's stored data can be changed based on the processing of the events. Computing system 200 can produce output stream 230, such as events 231-234. The events of output stream 230 can be of the same or different type, and/or of the same or different quantity, as the events of input stream 210.

Because one single processor can be overwhelmed or fail, more processors can be added to provide horizontal scaling. The multiple processors can each access shared state data store 220, but can see inconsistent state in the database, which is known as the multiple-writers' problem. A traditional solution to the multiple-writers' problem is to use locks, or instead transactions with retries. Locks can result in hangs if the locking process dies. However, in stream processing (e.g., distributed networking), the processors do not receive authoritative state from the state data store (e.g., 220), as the state data store can be changed by other processors while the state data store is responding; there is no absolute ordering of events among the multiple processors. Instead, the state information received at the processor can be considered a speculative state, as it may no longer match what is in the state data store. Using transactions with retries can be problematic when the determination of whether to reject the transaction for a retry is being made by the processor, as the processor has speculative state, not authoritative state. Retries do not work at scale in a distributed networking (e.g., a stream processing system) due to the lack of absolute ordering of events, and because repeated round-trip retries would be too slow and would not solve the problem anyway.

Events do not have a strict order in a distributed system. Load balancers are unable to determine in advance which of the keys will be mutated by which events. The parallel nature of the algorithm prevents achieving a single writer condition, especially in the presence of encryption. No matter how fast the state data store responds, it will take some time to respond to the processor. In that time, the data may have changed. Without locks, speculative state can be obtained at the processor but not authoritative state.

In many embodiments, the techniques described herein can overcome these drawbacks by using the state data store (e.g., 220) (e.g., database) not only as an "oracle" that provides a source of the data (which is speculative state by the time it is received at the processor), but also as a "judge" that assists in determining whether to reject the transaction in favor of a retry by determining if it is valid to transition of value for a key to a different value based on information provided by the processor. In several embodiments, an input stream of events (e.g., 210) can be speculatively processed, coalescing many database operations (e.g., calls to the state data store) into fewer database operations, and in some cases, a single database operation. The multiple writers' problem can be sidestepped by allowing for retries. In many embodiments, by coalescing multiple database operations into fewer database operations, performance can be significantly improved. In several embodiments, this approach can advantageously provide correctness, horizontal scalability, and performance improvements. Judging rejections/retries by the state data store (e.g., 220) can advantageously provide for correctness based on the authoritative state in the state data store (e.g., 220). A changeset approach to coalescing, as described below, instead of a naïve approach to coalescing, can beneficially provide performance improvements.

Naïve coalescing can result in errors and a lack of correctness. As an example, consider a processor that receives five packets, Packets 1-5, that each read key A. At the start of the process, the database stores the value 7 for key A. Using the processor to coalesce these five packets into a single read will provide the value of 7 for key A, and this value of 7 can be returned to those awaiting the results of reading key A. However, consider the example in which Packet 1 not only reads key A but also writes 25 as the value of key A. A naïve coalescing that consolidates the database operations (e.g., calls to the state data store) into a single database operation can return 7 as the value of key A for all cases, such that the reads for Packets 2-5 are wrong, as they were received after Packet 1 at the processor.

Figure 3:
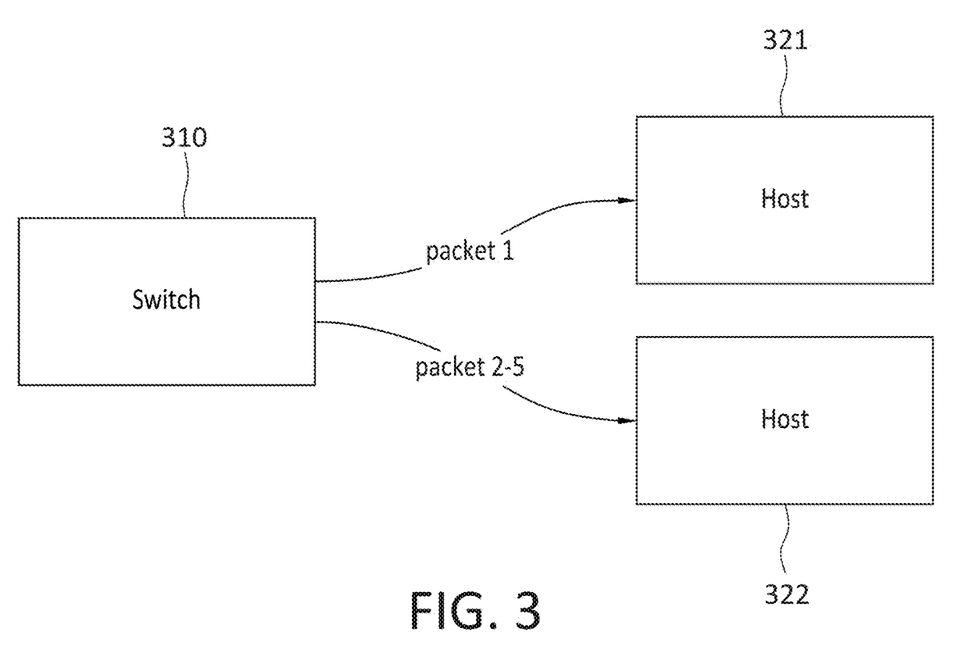
FIG. 3 illustrates a switch that provides packets to multiple hosts.

Turning ahead in the drawings, FIG. 3 illustrates a switch 310 that provides packets to multiple hosts 321-322. Naïve coalescing also results in errors when there are multiple hosts (e.g., 321-322) (e.g., multiple processors), as in FIG. 3, but such an arrangement can cause additional complications due to a lack of absolute ordering of events. For example, consider the example of FIG. 3, in which switch 310 load balances and sends packet 1 to host 321 and packets 2-5 to host 322. When there was a single host, there was an absolute ordering at the single host, but with load balancing, there is no absolute ordering of events among the multiple hosts 321-322. For example, host 321 can first process packet 1, or host 322 can first process packet 2, and there will be different results (e.g., packet 2 will return 7 if it is processed first, but it will return 25 if packet 1 is processed first), but there is no correct ordering in this load balancing scenario. Trying to address this problem by forcing all the packets to one of the hosts removes the benefits of horizontal scaling. Making host 322 wait for packet 1 (or any other number of packets that may have been sent to the first host), removes the benefits of horizontal scaling while incurring the costs of coordinating action between the additional hosts.

In many embodiments, the changeset coalescing techniques described herein can advantageously overcome the drawbacks of naïve coalescing by using the state data store not only as the oracle (e.g., to determine the state of key A), but also as a judge (e.g., to determine whether it is valid to transition the value of key A from 7 to 25).

An example of processing a sequence of events (e.g., a batch of five packets) at a first host is shown in Table 1 below. In this example, each of the packets involves only a single respective key. For example, packet 1 involves only key A, and packet 2 involves only key B. The first three columns show the packets, along with the operations and the associated key contained in those packets. The speculative result column is a speculation by the first host of what the result of the operation would be, based on the information that the first host has. The signal column indicates the operation to be performed for that key in a coalesced operation (e.g., any write operations for a key override reads for the key). The RC reject rules specify rules for the state data store (e.g., RAMCloud (RC) (e.g., 110 (FIG. 1)) to process when performing the operations, and the spec reject rules specify rules for the processor (the first host) to process when performing the operations after receiving information back from the state data store. The RC reject rules indicate when the state data store should reject the operation, which must occur when the initial condition of the state data store does not conform to the expectation made by the processor. The Spec reject rules indicate when the processor should reject the operation, which can occur when the information returned from the state data store does not conform with the expectation at the processor. This example assumes that the first host has just started up and has not yet made a call to the state data store to read the state of the database. In this case, all five packets are processed at the processor and coalesced before making a call to the state data store (RAMCloud). In many examples, the batch can contain far more than five packets, but this simplified example is shown for purposes of illustration and explanation.

TABLE 1

| Packet No. | Operation | Key | Speculative Result | Signal | RC Reject Rules | Spec Reject Rules |
|---|---|---|---|---|---|---|
| 1 | Read | A | null @ v0 | Read | none | Reject if exists |
| 1 | Write 14 | A | 14 @ v1 | Wrote | Reject if exists | Reject if exists |
| 1 | Write 19 | A | 19 @ v1 | Wrote | Reject if exists | Reject if exists |
| 2 | Read | B | null @ v0 | Read | none | Reject if exists |
| 2 | Write 123 | B | 123 @ v1 | Wrote | Reject if exists | Reject if exists |
| 3 | Read | C | null @ v0 | Read | none | Reject if exists |
| 4 | Read | A | 19 @ v1 | Wrote | N/A | Reject if exists |
| 4 | Write 29 | A | 29 @ v1 | Wrote | Reject if exists | Reject if exists |
| 5 | Read | F | null @ v0 | Read | none | Reject if exists |
| 5 | Write −42 | F | −42 @ v1 | Wrote | Reject if exists | Reject if exists |

As shown in Table 1, the first packet can arrive at the first host, and the network function at the first host can determine that it should read key A based on Packet 1. Because the first host has just started up and has not yet read state data from the state data store, the first host can assume that the entry does not exist. The first host can store speculative state for the keys that are processed by the first host. This data is speculative, and is not stored in the state data store (e.g., database). Because the first host has just started up and has not read the state of key A from the state data store, it assumes that key A is null. The RC reject rule is "none," because the operation is a read. And the Spec reject rule is "Reject if exists," because the processor has assumed, based on having just started up, that the value is null. Table 2 shows the speculative state of the first host after this first operation is considered. This speculative state in the first host may not match the authoritative state data in the state data store. But, as explained above, the information received at the first host, even after a call to the state data store, is still speculative, as the authoritative data in the state data store can change at any point. The first host does not make a call to the state data store at this point, but instead waits until the end of the batch of five packets.

TABLE 2

| Key | Value | Version | Signal |
|---|---|---|---|
| A | null | 0 | Read |

Continuing the example in Table 1, the processing of Packet 1 by the network function at the first host goes on to write 14 to key A, then write 19 to key A, which causes the speculative value of key A in the first host to become 14, then 19. The signal changes to "wrote" based on now having a write, and the RC reject rule is set to "Reject if exists," as the assumption made by the first host was that key A did not exist. At this point, the first host still does not make a call to the state data store.

Next, the network function at the first host starts the processing of Packet 2, deciding to read key B. The first host assumes the value of key B is null, similarly as it did with key A. The speculative state in the first host at this point is shown in Table 3.

TABLE 3

| Key | Value | Version | Signal |
|---|---|---|---|
| A | 19 | 1 | Wrote |
| B | null | 0 | Read |

Continuing the example in Table 1, the processing of Packet 2 by the network function at the first host goes on to write 123 to key B, which causes the speculative value of key B in the first host to become 123. The signal changes to "wrote" based on now having a write, and the RC reject rule is set to "Reject if exists," as the assumption made by the first host was that key B did not exist. At this point, the first host still does not make a call to the state data store. The RC reject rules and the Spec reject rules are set at each operation to prevent mistakes once the database operation (e.g., call to the state data store) happens and before processing of the batch at the first node is completed.

Next, the network function at the first host starts the processing of packet 3, deciding to read key C. The first host assumes the value of key C is null, similarly as it did with keys A and B. The speculative state in the first host at this point is shown in Table 4.

TABLE 4

| Key | Value | Version | Signal |
|---|---|---|---|
| A | 19 | 1 | Wrote |
| B | 123 | 1 | Wrote |
| C | null | 0 | Read |

Next, the network function at the first host starts the processing of packet 4, deciding to read key A. Based on the speculative state in the first host, the first host speculates that the value would be 19. Packet 4 then goes on in the first host to write 29 to key A, which causes the speculative value of key A in the first host to become 29. The speculative state in the first host at this point is shown in Table 5.

TABLE 5

| Key | Value | Version | Signal |
|---|---|---|---|
| A | 29 | 1 | Wrote |
| B | 123 | 1 | Wrote |
| C | null | 0 | Read |

Next, the network function at the first host starts the processing of Packet 5, deciding to read key F. The first host assumes the value of key F is null, similarly as it did with keys A, B, and C. Packet 5 then goes on in the first host to write −42 to key F, which causes the speculative value of key F in the first host to become −42. The speculative state in the first host at this point is shown in Table 6.

TABLE 6

| Key | Value | Version | Signal |
|---|---|---|---|
| A | 29 | 1 | Wrote |
| B | 123 | 1 | Wrote |
| C | null | 0 | Read |
| F | −42 | 1 | Wrote |

The initial processing of the packets by the first host is thus performed based on the speculative state in the first host. However, the packets are not emitted until the reject rules get processed, including the state data store processing the RC reject rules based on the authoritative state in the state data store, and the first host processing the Spec reject rules, based on an update of the speculative state after the database operation (e.g., call to the state data store). The first host has speculative state even after getting updated from a database operation. The host can thus compute speculative updates to the state data store, and set reject rules on those updates to reject the updates if the original speculation by the first host was wrong.

After the processing of Packet 5 internally in the first host, the first host can use a key value (KV) synchronization agent on the first host to walk the speculative state table (e.g., Table 6) to compute the speculative operations that the first host speculates are correct, based on its assumptions, as shown in the first two columns of Table 7. The associated RC Reject Rules for each of these operations are shown, which are sent to the state data store along with these operations. The Outcome column shows the overall outcome of the RC Reject Rules and the Spec Reject Rules, after a synchronizing ("sync") to the state data store (e.g., making one or more calls to the database in the state data store and providing the state data store with the information in the first three columns in Table 7), assuming that the old authoritative state in the state data store is as shown in Table 8 just before the sync to the state data store.

TABLE 7

| Key | Operation | RC Reject Rules | Outcome |
|---|---|---|---|
| A | Write 29 | If exists | rejected |
| B | Write 123 | If exists | rejected |
| C | Read | none | rejected |
| F | Write −42 | If exists | accepted |

TABLE 8

| Key | Value | Version |
|---|---|---|
| A | 82 | 1 |
| B | 4 | 17 |
| C | 5 | 824 |
| D | 17 | 5 |
| E | 9 | 18 |
| F | null | 0 |
| G | 22 | 2 |
| H | null | 7 |
| I | 14 | 1 |
| J | 9 | 18 |
| K | 127 | 3 |
| L | −82 | 6 |

TABLE 9

| Key | Value | Version |
|---|---|---|
| A | 82 | 1 |
| B | 4 | 17 |
| C | 5 | 824 |
| D | 17 | 5 |
| E | 9 | 18 |
| F | −42 | 1 |
| G | 22 | 2 |
| H | null | 7 |
| I | 14 | 1 |
| J | 9 | 18 |
| K | 127 | 3 |
| L | −82 | 6 |

The write operations for keys A and B both are rejected at the state data store because those keys exist (i.e., are not null). The read operation for key C is successfully processed at the state data store, but the Spec reject rule causes that operation to be rejected, as it was set to "reject if exists." The write operation for key F is successful, however, because the value for F was null (i.e., did not exist) in the authoritative state in the state data table. After the sync to the state data store, the new authoritative state in the state data store is as shown in Table 9, in which only the row for key F was changed. The state data for the four keys at issue, namely keys A, B, C, and F, are received at the first host, and used to update the speculative state in the first host. Even though this information was just received at the first host from the state data store, there is no guarantee that it is still authoritative, so it is used as the new speculative state at the first host. Table 10 shows the new speculative state in the first host.

TABLE 10

| Key | Value | Version |
|---|---|---|
| A | 82 | 1 |
| B | 4 | 17 |
| C | 5 | 824 |
| F | −42 | 1 |

Of the five packets in the batch in Table 1 ("Round 1"), the operations associated with four of the packets were rejected. Specifically, Packets 1-4 are rejected, and the source of each of those packets can choose to retry the packet or drop the packet. Packet 5 was successful, and is emitted as an output. In the processing of Table 1, 75% of the speculative operations were rejected, as shown in Table 7. However, on the next round of processing ("Round 2"), such as if Packets 1-4 are retried, the first host now will have more accurate speculative data. For example, consider a Round 2 in which Packets 1-4 are retried and a new Packet 6 is also received, as shown in Table 11. The processing of these packets on replay in the network function can result in different operations being requested by the network function.

TABLE 11

| Packet No. | Operation | Key | Speculative Result | Signal | RC Reject Rules | Spec Reject Rules |
|---|---|---|---|---|---|---|
| 1 | Read | A | 82 @ v1 | Read | none | if version != 1 |
| 1 | Write 97 | A | 97 @ v2 | Wrote | if version != 1 | if version != 1 |
| 1 | Remove | A | null @ v2 | Removed | if version != 1 | if operation failed |
| 2 | Read | B | 4 @ v17 | Read | null | if version != 17 |
| 2 | Write 5 | B | 5 @ v18 | Wrote | if version != 17 | if version != 18 |
| 3 | Read | C | 5 @ v824 | Read | null | if version != 824 |
| 4 | Read | A | null @ v2 | Removed | if version != 1 | if version != 2 |
| 4 | Write -7 | A | -7 @ v2 | Wrote | if version != 1 | if version != 2 |
| 6 | Read | K | null @ v0 | Read | null | if exists |
| 6 | Write 82 | K | 82 @ v1 | Wrote | if exists | if version != 1 |
| 6 | Remove | K | null @ v1 | Removed | if exists | if exists |

Initial processing of Packet 1 results in the speculative state for key A being updated to 97, then removed. The speculative state in the first host at this point is shown in Table 12.

TABLE 12

| Key | Value | Version | Signal |
|---|---|---|---|
| A | null | 2 | Removed |
| B | 4 | 17 | null |
| C | 5 | 824 | null |
| F | -42 | 1 | null |

Continuing the example in Table 11, the network function at the first host next starts the processing of Packet 2, deciding to read key B, then write 5 to key B. Next, the network function at the first host starts the processing of Packet 3, deciding to read key C. The speculative state in the first host at this point is shown in Table 13.

TABLE 13

| Key | Value | Version | Signal |
|---|---|---|---|
| A | null | 2 | Removed |
| B | 5 | 18 | Wrote |
| C | 5 | 824 | Read |
| F | -42 | 1 | null |

Next, the network function at the first host next starts the processing of Packet 4, deciding to read key A, then write -7 to key A. Finally, the network function at the first host starts the processing of Packet 6, deciding to read key K, which is assumed to be null at version 0, followed by writing 82 to key K, then removing key K. The speculative state in the first host at this point is shown in Table 14.

TABLE 14

| Key | Value | Version | Signal |
|---|---|---|---|
| A | -7 | 2 | Wrote |
| B | 5 | 18 | Wrote |
| C | 5 | 824 | Read |
| F | -42 | 1 | null |
| K | null | 1 | Removed |

After the processing of Packet 6 internally in the first host, the first host can use the KV synchronization agent on the first host to walk the speculative state table (e.g., Table 13) to compute the speculative operations that the first host speculates are correct, based on its assumptions, as shown in the first two columns of Table 15. The associated RC Reject rules for each of these operations are shown, which are sent to the state data store along with these operations. The Outcome column shows the overall outcome of the RC Reject Rules and the Spec Reject Rules, after a sync to the state data store, assuming that the old authoritative state in the state data store is as shown in Table 16 just before the sync to the state data store.

TABLE 15

| Key | Operation | Reject Rules | Outcome |
|---|---|---|---|
| A | Write -7 | version != 1 | accepted |
| B | Write 5 | version != 17 | accepted |
| C | Read | version != 824 | accepted |
| F | Remove | If exists | rejected |

TABLE 16

| Key | Value | Version |
|---|---|---|
| A | 82 | 1 |
| B | 4 | 17 |
| C | 5 | 824 |
| D | 17 | 5 |
| E | 9 | 18 |
| F | -42 | 1 |
| G | 22 | 2 |
| H | null | 7 |
| I | 14 | 1 |
| J | 9 | 18 |
| K | 127 | 3 |
| L | -82 | 6 |

TABLE 17

| Key | Value | Version |
|---|---|---|
| A | -7 | 2 |
| B | 5 | 18 |
| C | 5 | 824 |
| D | 17 | 5 |
| E | 9 | 18 |
| F | -42 | 1 |
| G | 22 | 2 |
| H | null | 7 |
| I | 14 | 1 |
| J | 9 | 18 |
| K | 127 | 3 |
| L | -82 | 6 |

The write operations for keys A and B both are accepted at the state data store and the processor, as the reject rules are not triggered. Similarly, the read for key C is accepted, as the reject rules are not triggered. The read operation for key C is successfully processed at the state data store, and the Spec reject rule is not rejected. The write operation for key K is rejected, however, because the value for K was not null (i.e., did exist) in the authoritative state in the state data table. After the sync to the state data store, the new authoritative packet, and the packet can be rejected unless all of those keys are accepted. Similarly, the Fate column indicates the keys that are grouped for that key, and the key can be rejected unless all of those keys in the group are accepted.

TABLE 19

| Packet No. | Operation | Key | Speculative Result | Signal | RC Reject Rules | Spec Reject Rules | Presuming |
|---|---|---|---|---|---|---|---|
| 1 | Read | A | −7 @ v2 | Read | none | if version != 2 | A |
| 1 | Read | B | −11 @ v274 | Read | none | if version != 274 | AB |
| 2 | Read | C | 18 @ v31 | Read | none | if version != 31 | C |
| 2 | Read | A | −7 @ v2 | Read | none | if version != 1 | AC |
| 2 | Write 29 | A | 29 @ v3 | Wrote | if version != 2 | if version != 3 | AC |
| 3 | Read | D | null @ v0 | Read | none | if exists | D |
| 3 | Write 129 | D | 129 @ v1 | Wrote | if exists | if version != 1 | D |
| 4 | Read | F | −42 @ v1 | Read | none | if version != 1 | F |
| 5 | Read | K | null @ v1 | Read | none | if exists | K | state in the state data store is as shown in Table 17, in which the rows for keys A and B were changed. The state data for the five keys at issue, namely keys A, B, C, F, and K, are received at the first host, and used to update the speculative state in the first host. Even though this information was just received at the first host from the state data store, there is no guarantee that it is still authoritative, so it is used as the new speculative state at the first host. Table 18 shows the new speculative state in the first host.

TABLE 18

| Key | Value | Version |
|---|---|---|
| A | −7 | 2 |
| B | 5 | 18 |
| C | 5 | 824 |
| F | −42 | 1 |
| K | 127 | 3 |

Of the five packets in the batch in Table 11 (Round 2), the operations associated with four of the packets were accepted. Specifically, Packets 1-4 were successful, and are emitted as output. Packet 6 was rejected, and the source of that packet can choose to retry the packet or drop the packet. In the processing of Table 11, 75% of the speculative operations were accepted, as shown in Table 15, which is much more favorable than the results in Round 1. The frequency of retries generally will depend on the network function and how well it interfaces with the RSS (Receive Side Scaling) of the NIC (network interface card). ECMP (equal-cost multi-path) routing can occur on the switch, and RSS can occur on the NIC. If the ECMP is favorable to the network function (e.g., as with the packet filter network function), then the changeset coalescing technique is unlikely to restart. If the ECMP is unfavorable to the network function (e.g., as with the NAT network function), then the algorithm can trigger restarts more often.

Another example of processing a sequence of events (e.g., a batch of five packets) at a first host is shown in Table 19 below. In this example, some of the packets involve multiple different keys. For example, Packet 1 involves keys A and B, and Packet 2 involves keys A and C. Table 19 shows the initial processing that is performed on these five packets, based on an initial speculative state that is in the first host, as shown in Table 20. Table 19 includes an additional column, the Presuming column, and Table 20 includes an additional column, the Fate column. The Presuming column indicates the keys that are presumed to be accepted for that

TABLE 20

| Key | Value | Version | Signal | Fate |
|---|---|---|---|---|
| A | −7 | 2 | null | null |
| B | −11 | 274 | null | null |
| C | 18 | 31 | null | null |
| D | null | 0 | null | null |
| F | −42 | 1 | null | null |
| K | null | 1 | null | null |

Initial processing of Packet 1 involves reads of keys A and B, such that the presuming is A for the read of A, and is A and B (expressed as AB) for the subsequent read of key B. At this point, A and B are both part of a single transaction, and Packet 1 has a presumption of AB. Next, the initial processing of Packet 2 involves reads of keys C and A, such that Packet 2 has a presumption of AC. Because both Packet 1 and Packet 2 involve key A, Packets 1 and 2 in fact have a presumption of ABC, as keys A, B, and C are now part of a single transaction. Proceeding through the rest of Packet 2, as well as Packets 3-5, results in a speculative state in the first host as shown in Table 21.

TABLE 21

| Key | Value | Version | Signal | Fate |
|---|---|---|---|---|
| A | 29 | 3 | Wrote | ABC |
| B | −11 | 274 | Read | ABC |
| C | 18 | 31 | Read | ABC |
| D | 129 | 1 | Wrote | D |
| F | −42 | 1 | Read | F |
| K | null | 1 | Read | K |

The packet presumptions at this point are shown in Table 22, which can be decoupled into the operations shown in Table 23. In other words, Packets 1 and 2 will be rejected unless the operations associated with keys A, B, and C are all accepted, as Packet 1 is dependent on the success of Packet 2.

TABLE 22

| Packet | Total Presumption |
|---|---|
| 1 | ABC |
| 2 | ABC |
| 3 | D |
| 4 | F |
| 5 | K |

TABLE 23

| Operations List | To Emit |
| --- | --- |
| write(a, 29, reject if version != 2) | 1, 2 |
| read(b, reject if version != 274) | |
| read(c, reject if version != 32) | |
| write(d, 129, reject if version != 1) | 3 |
| read(f, reject if version != 1) | 4 |
| read(k, reject if exists) | 5 |

The decoupled operations in Table 23 can be converted to the catenative operations shown in Table 24, which can be used in a sync with the state data store.

TABLE 24

| Operation Type | Operation |
| --- | --- |
| transaction | [<br>  transaction {<br>    write(a, 29, reject if version != 2)<br>    read(b, reject if version != 274)<br>    read(c, reject if version != 32)<br>  }<br>] |
| write | [<br>  MultiWrite {<br>    write(d, 129, reject if version != 1)<br>  }<br>] |
| read | [<br>  MultiRead {<br>    read(f, reject if version != 1)<br>    read(k, reject if exists)<br>  }<br>] |
| remove | null |
| increment | null |

An example of behavior or a network function in a key value client thread as shown in the pseudocode listed in Algorithm 1 below. In Algorithm 1, xkey refers to "extended key," which includes the key and the table name, and xvalue refers to "extended value," which includes the value and the timestamp expiration.

```
ALGORITHM 1: Sample network function behavior on kv_client thread call_internal(batch packets, kv_recorder r) {
    for (packet pkt : packets) {
        // any initial operations
        xkey k1 = /* compute key 1 based on pkt; */
        xkey k2 = /* compute key 2 based on pkt; */
        xvalue v1 = r.read(k1); /* no version number needed,
            r can figure it out based on
            speculative state */
        xvalue v2 = r.read(k2); // no version number needed,
            r can figure it out
        // compute new value for v1, v2, and or mutate pkt
        r.write(k1, v1); // no version number needed here,
            r can figure out version and reject rules
        r.write(k2, v2); // no explicit transaction needed here,
            r handles this implicity
        r.speculative_update(pkt, some_field, some_value);
            // some_field, some_value may be derived from v1,
            v2, pkt, or none of these
        // any final operations
    }
}
```

Algorithm 2 below shows pseudocode for a key value daemon that can process packets on "keyset" threads that coalesce packets based on keys.

```
ALGORITHM 2: kv_daemon behavior while (buffer_non_empty( )) { //Read incoming messages and
    enqueue to keysey threads
    kv_client_message msg = get_message_from_buffer( );
    keyset ks = get_queue_keyset(msg);
    enqueue_to_keyset(ks, msg);
}
// Handle each keyset thread
for (keyset ks, kv_client_message msg :
get_keyset_and_first_message_of_that_queue( )) {
    if(not_tracking_any_tables_from(ks)) {
        create_or_get_exisiting_tables_needed_for(ks);
    }
    if (local_cache_version_validation_fails(msg.directives( ))){
        force_message_in_queue_to_retry
        (ks, get_latest_kv_speculations(ks)); continue;
        // prevents wasting RAMCloud time
    }
    list<item> items;
    for (directive d : msg.directives( )) {
        // Build list of instructions to run on RAMCloud
        switch d.type( ):
            case is_remove:
                items.append(item(remove, d.xkey( ),
                    rr.reject_if_not(d.version( )))); break;
            case is_create:
                items.append(item(write, d.xkey( ), d.xvalue( ),
                    rr.reject_if_exists( ))); break;
            case is_modify:
                items.append(item(write, d.xkey( ), d.value( ),
                    rr.reject_if_not(d.version( )))); break;
            case is_verify_unmodified:
                items.append(item(read, d.xkey( ),
                    rr.reject_if_not(d.version( )))): break;
            case is_verify_nonexistance:
                items.append(item(read, d.xkey( ),
                    rr.reject_if_exists( ))); break;
    }
    add_to_ramcloud_instructions(items);
}
for (list<item> items : ramcloud_instructions( )) {
    // Batch operations by type
    if (items.size( ) >= 2) {
        ramcloud.add_to_transaction_batch(items);
        // 2 or more items is a transaction
    } else switch (items[0].instruction) {
        case read:
            ramcloud.add_to_read_batch(items[0]); break;
        case write:
            ramcloud.add_to_write_batch(items[0]); break;
        case remove:
            ramcloud.add_to_remove_batch(items[0]); break;
    }
}
//Perform RAMCloud operations asynchronously
ramcloud.do_asnyc_transactions_using_transaction_batch( );
ramcloud.do_async_reads_using_read_batch( );
ramcloud.do_async_writes_using_write_batch( );
ramcloud.do_async_removes_using_remove_batch( );
for (response r : ramcloud_response( )) {
    // Handle responses from RAMCloud
    keyset ks, kv_client_message msg =
    get_queue_and_first_message_for(r);
    msg.set_outcome(r.outcome( ));
    asnyc_get_latest_kv_speculation(keyset, r);
    // fires async reads to RAMCloud when original
    // read/write/remove/transaction didn't get xvalues and
    versions for the specified xkeys
}
for (response r : ramcloud_response( )) {
    // Handle latest speculation from RAMCloud
    keyset ks, kv_client_message msg =
    get_queue_and_first_message_for(r);
    msg.set_latest_kv_speculation(r.kv_speculation( ));
    send_response_to_client(msg);
    // whether msg.outcome( ) is success or not, send the msg
    for(kv_client_msg other_msg :
```

-continued

ALGORITHM 2: kv_daemon behavior

```
        get_remaining_msgs_in_queue_for(ks)) {
            other_msg.add_outcome_and_latest_kv_speculation
            (please_retry, r.kv_speculation( ));
            send_response_to_client(msg);
        }
    }
}
```

Algorithm 3 below shows for the key value client handling the messages returned from the key value daemon.

ALGORITHM 3: Client messages returning to kv_client

```
map<network_function, batch> nf_and_packets_to_run;
while (buffer_non_empty( )) {
    kv_client_message msg = get_message_from_buffer( );
    network_function nf = msg.current_nf( );
    // update speculation to allow subsequent
    latest_known_speculation call to have "better info"
    cache.update_speculation(msg.latest_kv_speculation( ));
    batch packets = msg.get_corresponding_packets( );
    // get packets for the keyset
    kv_recorder r = get_speculative_decisions_for(packets);
    // get what the decisions were earlier
    if (msg.outcome( ) == success) {
        for (packet p : packets) { // Handle the successes
            if (r.speculative_decision_was_to_drop(p)) {
                nf.stat_record_drop(p);
                // if NF had decided to drop packet, then drop
                delete p;
            } else { // any speculative decisions become real
                make_speculative_field_changes_real(p);
                nf.stat_record_accept(p);
                network_function next_nf =
                r.get_speculative_next_nf(p);
                // packets new to an NF AFTER anything being retried
                nf_and_packets_to_run[next_nf].append(p);
            }
        }
    } else { // not success, so erase the speculative decisions
        r.erase_speculative_decisions_for(packets);
        // put retrying packets BEFORE packets new to an NF
        to attempt to preserve order
        nf_and_packets_to_run[nf].prepend(packets);
    }
}
for ((network_function nf, batch packets) :
nf_and_packets_to_run) { nf->call(packets); }
```

In many embodiments, the changeset coalescing technique can use causal inference to determine whether to accept, or instead to reject and retry. This causal inference can allow coalescing many operations into one operation. The term "changeset" can be used because the implementation with the key-value state database can be similar to changesets in version control and GUI (graphical user interface) applications (apps) updating a database. The work can be performed initially, with a one-shot attempt to commit to the server or database with the net change.

In many embodiments, the techniques described herein can provide an alternative approach to cache-coherence that can handle stream-processing events with retries. Various network functions, such as NAT transformations and IPSec sessions, can prevent network functions from knowing state keys in advance, such that cache coherence is not practical. In several embodiments, the techniques described herein can use the database (state data store) as not only the oracle that provides the state data value, but also the judge, which is the approver of update attempts on the key, such that the authoritative state in the database is used in determinations by the database on whether to retry one or more coalesced operations. In some embodiments, the batching of state request inputs mentioned in the '348 Patent can be handled using the changeset coalescing techniques described herein.

In several embodiments, the techniques described herein can be used in other contexts outside stateless network functions. For example, these techniques can be used in distributed stream processing with a central database. Failure to update can be a regular part of the system, as retry can be expected behavior, which has become increasingly relevant in other research areas, such as Neural Network Models, Hidden Markov Models, etc. In a number of embodiments, by using improved coalescing techniques, the number of database operations can be significantly decreased, while reducing reprocessing. In many embodiments, the key value state database can be extended beyond the standard paradigms of create, read, update, remove, as the central authority can be the database.

Figure 4:
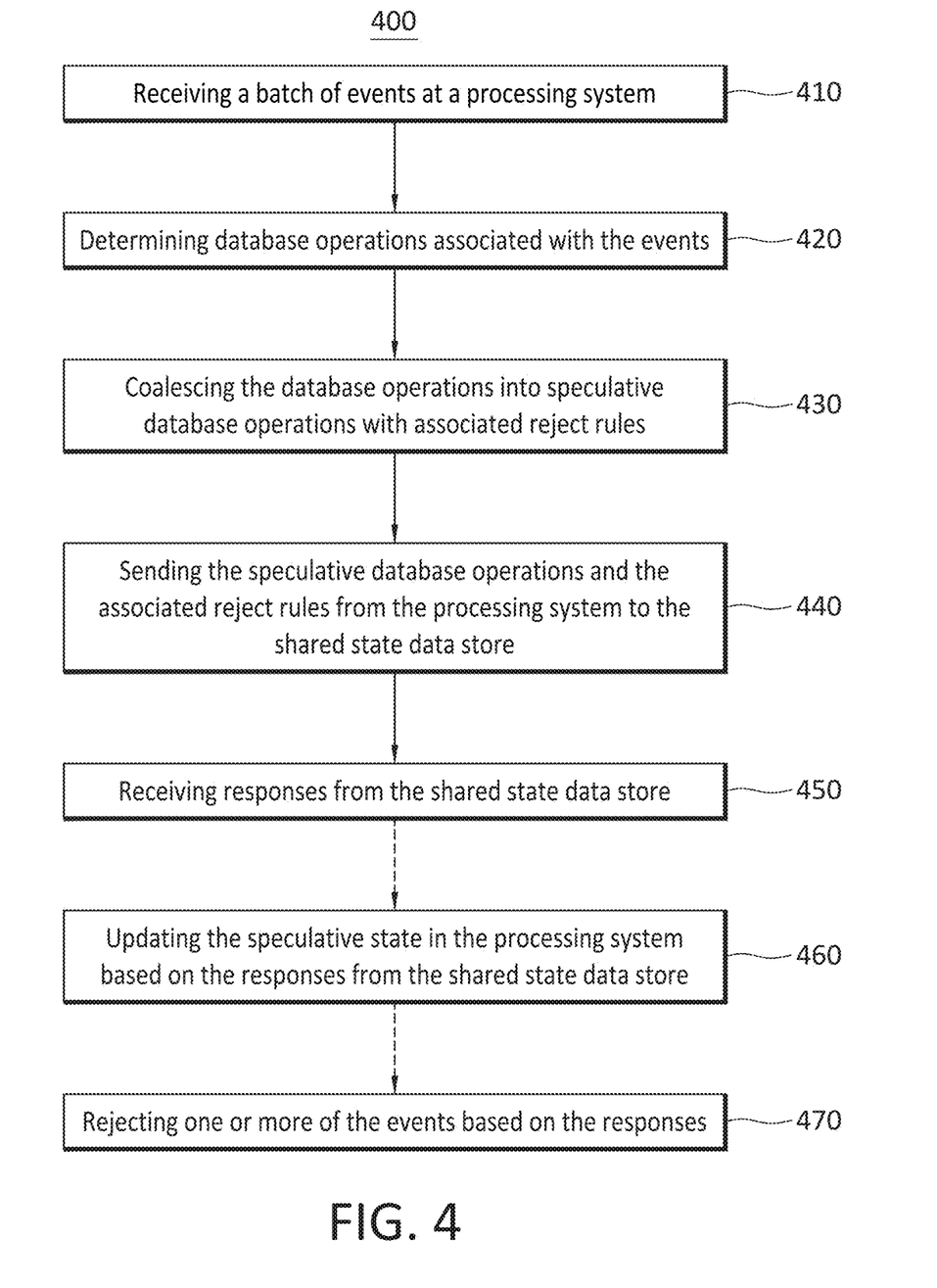
FIG. 4 illustrates a flow chart for a method of coalescing packets with multiple writers in a stateless network function, according to an embodiment.

Turning ahead in the drawings, FIG. 4 illustrates a flow chart for a method 400 of coalescing packets with multiple writers in a stateless network function, according to an embodiment. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

Referring to FIG. 4, method 400 can include an activity 410 of receiving a batch of events at a processing system of a distributed stream processing system including multiple processing systems in data communication with a shared state data store. In many embodiments, the processing system and/or each of the multiple processing systems can be similar or identical to computing system 200 (FIG. 2), and/or can be similar to computational environment 600 of FIG. 6 of the '348 Patent, and various elements of the processing system and/or each of the multiple processing systems can be similar or identical to various elements of computing system 200 (FIG. 2) and/or computational environment 600 of FIG. 6 of the '348 Patent. In many embodiments, the processing system can perform method 400. In these or other embodiments, one or more of the activities of method 400 can be implemented as one or more computing instructions configured to run at one or more processors and configured to be stored at one or more non-transitory computer readable media. Such non-transitory computer readable media can be part of the processing system. In some embodiments, the processing system can implement a stateless network function. For example, the stateless network function can be a packet filter (e.g., 151-153 (FIG. 1)), a network address translator (e.g., 140 (FIG. 1)), a router (e.g., 120 (FIG. 1)), an IPSec protocol (e.g., 130 (FIG. 1)), or another suitable stateless network function. The shared state data store can be similar or identical to RAMCloud 110 (FIG. 1) and/or state data store 220 (FIG. 2). In some embodiments, the shared state data store can be located outside the multiple processing systems. The batch of events can be similar or identical to input stream 210 (FIG. 2)

In a number of embodiments, method 400 also can include an activity 420 of determining, at the processing system, database operations associated with the events. The database operations can be similar or identical to those database operations described above, or other suitable database operations.

In several embodiments, method 400 additionally can include an activity 430 of coalescing, at the processing system, the database operations into one or more speculative database operations with one or more associated reject rules. The speculative database operations can be similar or identical to the speculative operations described above. The associated reject rules can be similar or identical to the RC Reject Rules described above. For example, the speculative database operations can be similar or identical to the speculative operations listed in Tables 7 or 15, and the associated reject rules can be similar or identical to the RC Reject Rules listed in Table 7 or 15, respectively. In some embodiments, the processing system can store a speculative state of at least a portion of the shared state data store. The speculative state can be similar or identical to the speculative state described above. In several embodiments, the one or more associated reject rules are based on the speculative state.

In a number of embodiments, method 400 further can include an activity 440 of sending the one or more speculative database operations and the one or more associated reject rules from the processing system to the shared state data store to cause the shared state data store to determine whether to reject one or more of the one or more speculative database operations based on an authoritative state in the shared state data store. For example, the shared state data store can determine whether to reject one or more of the one or more speculative database operations as described above and/or in Algorithm 2.

In several embodiments, method 400 additionally can include an activity 450 of receiving, at the processing system, one or more responses from the shared state data store. In various embodiments, the one or more responses can include one or more rejections of the one or more speculative database operations.

In a number of embodiments, method 400 further and optionally can include an activity 460 of updating the speculative state in the processing system based on the one or more responses from the shared state data store. For example, the processing system can update the speculative state as described above and/or in Algorithm 3.

In several embodiments, method 400 additionally and optionally can include an activity 470 of rejecting one or more of the events based on the one or more responses. The source of the events that are rejected can be choose to retry or drop such events.

Although coalescing packets with multiple writers in a stateless network function has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that various elements of FIGS. 1-4 and/or FIGS. 1-7 of the '348 Patent may be modified, combined, and/or interchanged, and that the foregoing discussion of certain of these embodiments does not necessarily represent a complete description of all possible embodiments. As another, one or more of the procedures, processes, or activities of FIG. 4 may include different procedures, processes, and/or activities and be performed by many different modules, in many different orders, and/or one or more of the procedures, processes. As yet another example, the elements of FIGS. 1-4 of this application and/or FIGS. 1-7 of the '348 Patent can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method comprising:
    receiving a batch of events at a processing system of a distributed stream processing system comprising multiple processing systems in data communication with a shared state data store;
    determining, at the processing system, database operations associated with the events;
    coalescing, at the processing system, the database operations into one or more speculative database operations with one or more associated reject rules, wherein the processing system stores a speculative state of at least a portion of the shared state data store, and wherein the one or more associated reject rules are based on the speculative state;
    sending the one or more speculative database operations and the one or more associated reject rules from the processing system to the shared state data store to cause the shared state data store to determine whether to reject one or more of the one or more speculative database operations based on an authoritative state in the shared state data store; and
    receiving, at the processing system, one or more responses from the shared state data store, wherein the one or more responses comprise one or more rejections of the one or more speculative database operations.

2. The method of claim 1 further comprising:
    updating the speculative state in the processing system based on the one or more responses from the shared state data store.

3. The method of claim 1 further comprising:
    rejecting one or more of the events based on the one or more responses.

4. The method of claim 1, wherein:
    the processing system implements a stateless network function; and
    the shared state data store is located outside the multiple processing systems.

5. The method of claim 4, wherein:
    the stateless network function is one of a packet filter, a network address translator, a router, or an IPSec protocol.

6. The method of claim 1 further comprising: updating the speculative state in the processing system based on the one or more responses from the shared state data store; and rejecting one or more of the events based on the one or more responses, wherein: the processing system implements a stateless network function; the shared state data store is located outside the multiple processing systems; and the stateless network function is one of a packet filter, a network address translator, a router, or an IPSec protocol.

7. One or more non-transitory computer-readable media storing computing instructions that, when executed on a processor, cause the processor to perform:
   receiving a batch of events at a processing system of a distributed stream processing system comprising multiple processing systems in data communication with a shared state data store;
   determining, at the processing system, database operations associated with the events;
   coalescing, at the processing system, the database operations into one or more speculative database operations with one or more associated reject rules, wherein the processing system stores a speculative state of at least a portion of the shared state data store, and wherein the one or more associated reject rules are based on the speculative state;
   sending the one or more speculative database operations and the one or more associated reject rules from the processing system to the shared state data store to cause the shared state data store to determine whether to reject one or more of the one or more speculative database operations based on an authoritative state in the shared state data store; and
   receiving, at the processing system, one or more responses from the shared state data store, wherein the one or more responses comprise one or more rejections of the one or more speculative database operations.

8. The one or more non-transitory computer-readable media of claim 7, wherein the computing instructions, when executed on the processor, further cause the processor to perform:
   updating the speculative state in the processing system based on the one or more responses from the shared state data store.

9. The one or more non-transitory computer-readable media of claim 7, wherein the computing instructions, when executed on the processor, further cause the processor to perform:
   rejecting one or more of the events based on the one or more responses.

10. The one or more non-transitory computer-readable media of claim 7, wherein:
    the processing system implements a stateless network function; and
    the shared state data store is located outside the multiple processing systems.

11. The one or more non-transitory computer-readable media of claim 7, wherein the computing instructions, when executed on the processor, further cause the processor to perform: updating the speculative state in the processing system based on the one or more responses from the shared state data store; and rejecting one or more of the events based on the one or more responses, wherein: the processing system implements a stateless network function; the shared state data store is located outside the multiple processing systems; and the stateless network function is one of a packet filter, a network address translator, a router, or an IPSec protocol.

12. A system comprising:
    a processor; and
    one or more non-transitory computer-readable media storing computing instructions that, when executed on the processor, cause the processor to perform:
    receiving a batch of events at a processing system of a distributed stream processing system comprising multiple processing systems in data communication with a shared state data store;
    determining, at the processing system, database operations associated with the events;
    coalescing, at the processing system, the database operations into one or more speculative database operations with one or more associated reject rules, wherein the processing system stores a speculative state of at least a portion of the shared state data store, and wherein the one or more associated reject rules are based on the speculative state;
    sending the one or more speculative database operations and the one or more associated reject rules from the processing system to the shared state data store to cause the shared state data store to determine whether to reject one or more of the one or more speculative database operations based on an authoritative state in the shared state data store; and
    receiving, at the processing system, one or more responses from the shared state data store, wherein the one or more responses comprise one or more rejections of the one or more speculative database operations.

13. The system of claim 12, wherein the computing instructions, when executed on the processor, further cause the processor to perform:
    updating the speculative state in the processing system based on the one or more responses from the shared state data store.

14. The system of claim 12, wherein the computing instructions, when executed on the processor, further cause the processor to perform:
    rejecting one or more of the events based on the one or more responses.

15. The system of claim 12, wherein:
    the processing system implements a stateless network function; and
    the shared state data store is located outside the multiple processing systems.

16. The system of claim 15, wherein:
    the stateless network function is one of a packet filter, a network address translator, a router, or an IPSec protocol.

17. The system of claim 12, wherein the computing instructions, when executed on the processor, further cause the processor to perform: updating the speculative state in the processing system based on the one or more responses from the shared state data store; and rejecting one or more of the events based on the one or more responses, wherein: the processing system implements a stateless network function; the shared state data store is located outside the multiple processing systems; and the stateless network function is one of a packet filter, a network address translator, a router, or an IPSec protocol.

* * * * *